United States Patent
Abe et al.

(10) Patent No.: US 11,981,321 B2
(45) Date of Patent: May 14, 2024

(54) CONTROLLER FOR VEHICLE

(71) Applicant: MITSUBISHI JIDOSHA KOGYO KABUSHIKI KAISHA, Tokyo (JP)

(72) Inventors: Hironori Abe, Tokyo (JP); Kazunori Handa, Tokyo (JP); Daizo Ogino, Tokyo (JP); Hitoshi Takeuchi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 371 days.

(21) Appl. No.: 17/419,558

(22) PCT Filed: Nov. 7, 2019

(86) PCT No.: PCT/JP2019/043741
§ 371 (c)(1),
(2) Date: Jun. 29, 2021

(87) PCT Pub. No.: WO2020/148973
PCT Pub. Date: Jul. 23, 2020

(65) Prior Publication Data
US 2022/0063594 A1 Mar. 3, 2022

(30) Foreign Application Priority Data
Jan. 18, 2019 (JP) .................................. 2019-007159

(51) Int. Cl.
*B60W 20/40* (2016.01)
*B60K 6/485* (2007.10)

(52) U.S. Cl.
CPC ............. *B60W 20/40* (2013.01); *B60K 6/485* (2013.01); *B60Y 2200/92* (2013.01)

(58) Field of Classification Search
CPC ............. B60W 20/40; B60W 2520/10; B60W 2540/10; B60W 2710/086; B60W 10/02;
(Continued)

(56) References Cited

U.S. PATENT DOCUMENTS

2004/0134698 A1* 7/2004 Yamamoto ............ B60W 20/40
180/65.225
2007/0197336 A1* 8/2007 Tabata .................. B60W 10/08
475/150
(Continued)

FOREIGN PATENT DOCUMENTS

CN 109532455 A * 3/2019 ............. B60K 6/365
EP 1433641 A1 * 6/2004 ............... B60K 6/44
(Continued)

OTHER PUBLICATIONS

Maruyama Tomoyuki, JP2012046115.translate, Hybrid Driving Device for Vehicle. (Year: 2012).*
(Continued)

*Primary Examiner* — B M M Hannan
(74) *Attorney, Agent, or Firm* — Birch, Stewart, Kolasch & Birch, LLP

(57) ABSTRACT

A vehicle (10) has mounted therein an engine (2), a first rotating electric machine (3), and a second rotating electric machine (4). The power of the engine (2) and the power of the first rotating electric machine (3) are separately transmitted from different power transmission paths (41, 42) to drive wheels (5). The power of the engine (2) is also transmitted to the second rotating electric machine (4) and utilized to generate electrical power. The vehicle (10) is provided with a connecting/disconnecting mechanism (8) on the power transmission path (42) that transmits the power of the first rotating electric machine (3) to the drive wheels (5). A controller (1) of the vehicle (10) calculates a requested driving power of the vehicle (10), and when the connecting/disconnecting mechanism (8) is shifted from a disengaged state to an engaged state to deal with an increase in the requested driving power while the engine (2) is running, makes the second rotating electric machine (4) power run (Continued)

and transmits power of the second rotating electric machine (4) to the drive wheels (5).

4 Claims, 6 Drawing Sheets

(58) Field of Classification Search
CPC ...... B60W 10/06; B60W 20/30; B60W 10/08; B60K 6/485; B60K 6/387; B60K 6/442; B60Y 2200/92; Y02T 10/62; Y02T 10/72; B60L 50/15; B60L 50/16
USPC .......................................................... 701/22
See application file for complete search history.

(56) References Cited

U.S. PATENT DOCUMENTS

| | | | | |
|---|---|---|---|---|
| 2014/0129067 A1* | 5/2014 | Furukawa | ............ | B60W 10/06 903/945 |
| 2014/0238766 A1* | 8/2014 | Hasuda | ............... | B60L 15/2036 180/233 |
| 2014/0366682 A1* | 12/2014 | Murata | .................. | B60K 6/105 74/572.2 |
| 2017/0102070 A1* | 4/2017 | Hirokami | ............. | B60W 10/02 |
| 2019/0270373 A1 | 9/2019 | Ogino et al. | | |

FOREIGN PATENT DOCUMENTS

| | | | | | |
|---|---|---|---|---|---|
| JP | 2004274917 | A | * | 9/2004 | |
| JP | 2005-351381 | A | | 12/2005 | |
| JP | 3892611 | B2 | * | 3/2007 | ............. B60K 6/543 |
| JP | 2008157349 | A | * | 7/2008 | |
| JP | 2008195097 | A | * | 8/2008 | |
| JP | 2008296612 | A | * | 12/2008 | ............. B60K 6/365 |
| JP | 2012-46115 | A | | 3/2012 | |
| JP | 2013124064 | A | * | 6/2013 | |
| KR | 101561813 | B1 | * | 10/2015 | |
| WO | WO2017/217067 | A1 | | 12/2017 | |

OTHER PUBLICATIONS

Hamada Yasushi (JP 2008195097), Steering Lock Device of Vehicle. (Year: 2008).*
International Search Report, issued in PCT/JP2019/043741, PCT/ISA/210, dated Jan. 21, 2020.
Written Opinion of the International Searching Authority, issued in PCT/JP2019/043741, PCT/ISA/237, dated Jan. 21, 2020.
English translation of International Preliminary Report on Patentability and Written Opinion of the International Searching Authority for International Application No. PCT/JP2019/043741, dated Jun. 16, 2021.

* cited by examiner

⟨PARALLEL MODE WITH MOTOR ASSIST⟩

CONTROLLER FOR VEHICLE

TECHNICAL FIELD

This disclosure relates to a controller for a vehicle provided with an engine and a first rotating electric machine, each serving as a driving source, and a second rotating electric machine that generates power using power of the engine.

BACKGROUND ART

Conventionally, a hybrid vehicle equipped with an engine and a rotating electric machine (motor, generator, motor generator) and also runs while switching its running mode has been practically used. The running mode includes: an EV mode in which the vehicle runs only on the motor using the charged power of a battery; a series mode in which the vehicle runs only on the motor while the generator is made to generate electricity by the engine; and a parallel mode that the vehicle runs mainly on the engine while being assisted by the motor if needed.

In the hybrid vehicle capable of individually outputting the power of the engine and the power of the motor, a power transmission path from the engine to the drive wheels and a power transmission path from the motor to the drive wheels are provided separately. In general, such the hybrid vehicle selects a mode (parallel mode), in which the vehicle runs mainly on the engine, at a high vehicle speed. In the parallel mode, if the motor assist is not required, i.e., if the vehicle can run only on the power of the engine, the motor is corotated, being accompanied by the drive wheels. If the induced voltage generated by this corotation of the motor exceeds the voltage of the driving-purpose battery, the regenerative brake will be activated on the vehicle, which may give a driver a feeling of discomfort.

Conventionally, in order not to give such a discomfort, occurrence of unintentional regenerative braking during high-speed running has been prohibited by performing flux-weakening control. However, since the implementation of the flux-weakening control consumes electric power, implementation of this control is not preferable from the viewpoint of improvement in electric efficiency. As a solution to this problem, there is proposed to provide a clutch (connecting/disconnecting mechanism) for disengaging the motor from the power transmission path if the motor assist is not required during the engine running (e.g., see Patent Document 1).

PRIOR ART DOCUMENTS

Patent Literature

[Patent Document 1] International Publication No. 2017/217067

SUMMARY

Problems

However, in a vehicle equipped with the above-described clutch, even if engagement of the clutch being in the disengaged state is started, the engagement is not completed immediately, so there is a problem that it takes a time to transmit the power of the motor to the drive wheels. This means that since the response delays even in a circumference where the motor assist is required, there is room for improvement in the engagement of the clutch.

With the foregoing problems in view, one of the objects is to provide a controller for a vehicle, the controller being able to improve a response delay when the connecting/disconnecting mechanism is to be engaged. It addition to the above object, an advantageous effect that is derived from each configuration shown in the following detailed modes to carry out present disclosure and which is not obtained by the conventional technique can be regarded as another object of the present disclosure.

Means to Solve Problem (1) A controller for a vehicle disclosed herein mounts thereon an engine, a first rotating electric machine, and a second rotating electric machine; transmits power of the engine and power of the first rotating electric machine to a drive wheel through respective power transmission paths independently of each other; and generates electric power by supplying the power of the engine to the second rotating electric machine. The vehicle includes a connecting/disconnecting mechanism on the power transmission path through which the power of the first rotating electric machine is transmitted to the drive wheel. The controller calculates a requested driving power of the vehicle, and when the connecting/disconnecting mechanism is shifted from a disengaged state to an engaged state to deal with an increase in the requested driving power while the engine is running, makes the second rotating electric machine power run and transmits power of the second rotating electric machine to the drive wheel.

The first rotating electric machine means an electric motor generator or an electric motor having a rotating armature or a field and having at least an electric function. Further, the second rotating electric machine means a motor generator or a generator having a rotating armature or a field and having at least a generating function. Examples of the connecting/disconnecting mechanism are a clutch mechanism such as a multi-plate clutch or a dog clutch, a synchromesh mechanism using an engaging member (sleeve), and a planetary gear mechanism using a sun gear, a carrier, and a ring gear.

(2) It is preferable that the controller makes the first rotating electric machine power run after shifting of the connecting/disconnecting mechanism into the engaged state is completed.

(3) It is preferable that the controller makes the second rotating electric machine into a no-load state or a power-running state according to the requested driving power after shifting of the connecting/disconnecting mechanism into the engaged state is completed.

(4) It is preferable that the controller controls the second rotating electric machine to be in the power-running state when the requested driving power comes to be equal to or larger than a threshold larger than a maximum driving power of the engine after shifting of the connecting/disconnecting mechanism into the engaged state is completed; and the controller controls the second rotating electric machine to be in the no-load state when the requested driving power comes to be less than the threshold after shifting of the connecting/disconnecting mechanism into the engaged state is completed.

(5) It is preferable that the controller shifts the connecting/disconnecting mechanism from the disengaged state to the engaged state when the requested driving power comes to be larger than a maximum driving power of the engine while the engine is running.

Effects

According to the disclosed controller, a response delay for engagement of the connecting/disconnecting mechanism since an accelerator pedal has been depressed, for example, can be compensated by the driving power of the second rotating electric machine. Therefore, it is possible to improve the response delay at the time of engagement of the connecting/disconnecting mechanism.

DETAILED DESCRIPTION

Description will now be made in relation to a controller for a vehicle according to an embodiment with reference to the accompanying drawings. The following embodiment is merely illustrative and is not intended to exclude the application of various modifications and techniques not explicitly described in the embodiment. Each configuration of the present embodiment can be variously modified and implemented without departing from the scope thereof. Also, the configuration can be selected or omitted according to the requirement or appropriately combined.

1. Overall Configuration

Figure 1:
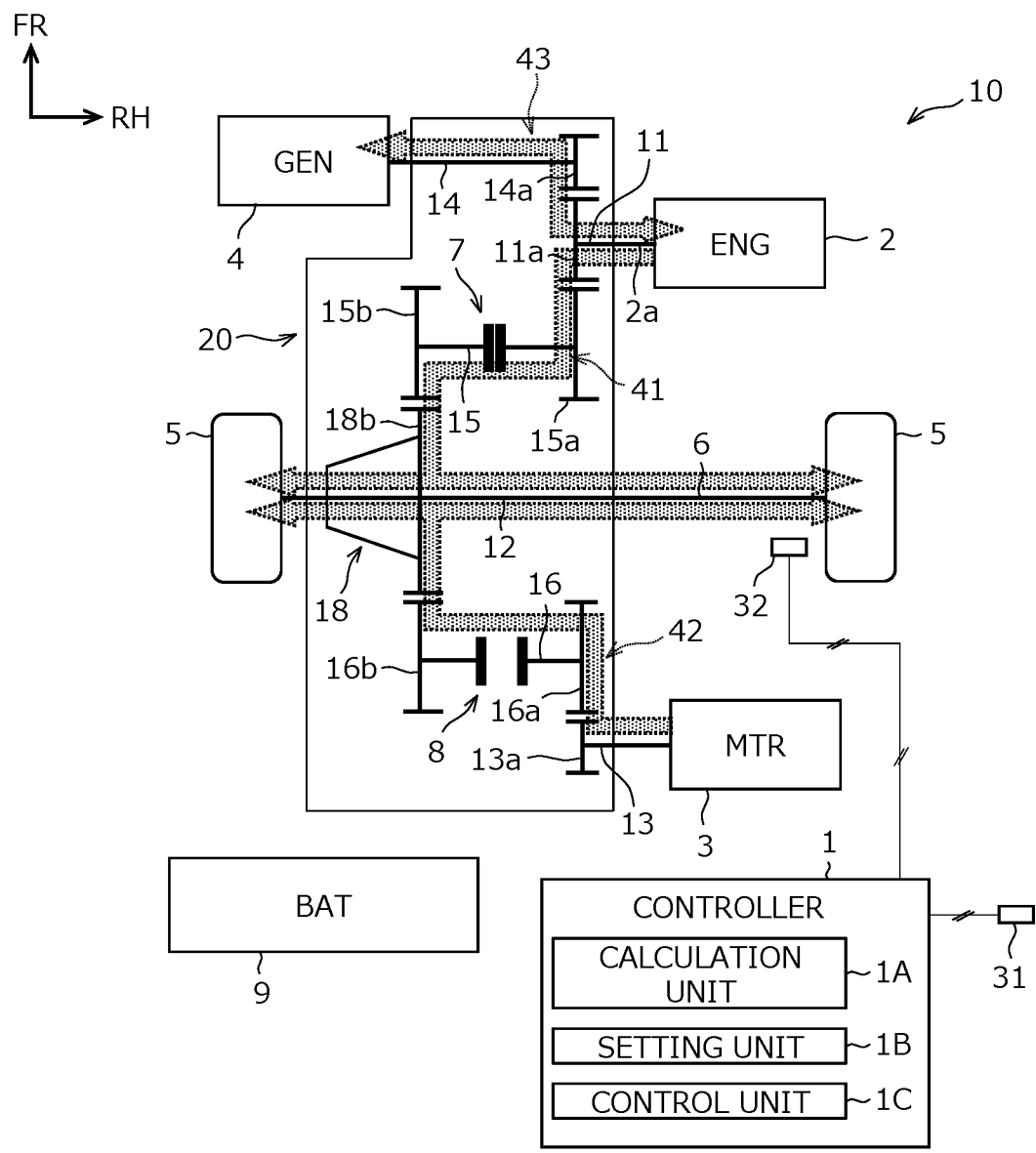
FIG. 1 is a schematic diagram illustrating a configuration of a hybrid vehicle in which a controller according to an embodiment is mounted.

A controller 1 of this embodiment is applied to a vehicle 10 shown in FIG. 1, and controls an engine 2, a motor 3, a generator 4, clutches 7 and 8, and the like mounted on the vehicle 10. This vehicle 10 is a hybrid vehicle equipped with the engine 2 serving as a driving source, the motor 3 (first rotating electric machine) for running, and the generator 4 (second rotating electric machine) for power generation. The present embodiment assumes that these devices 2, 3, 4 are mounted on the front side of the vehicle 10.

The generator 4 is coupled to the engine 2 and is operable independently of the operating state of the motor 3. For the vehicle 10, three running modes of an EV mode, a series mode, and a parallel mode are prepared. These running modes are alternatively selected according to the vehicle state, the running state, and a requested driving power of the driver by the controller 1, and the engine 2, the motor 3, and the generator 4 are individually used depending on the selected mode.

Figure 2:
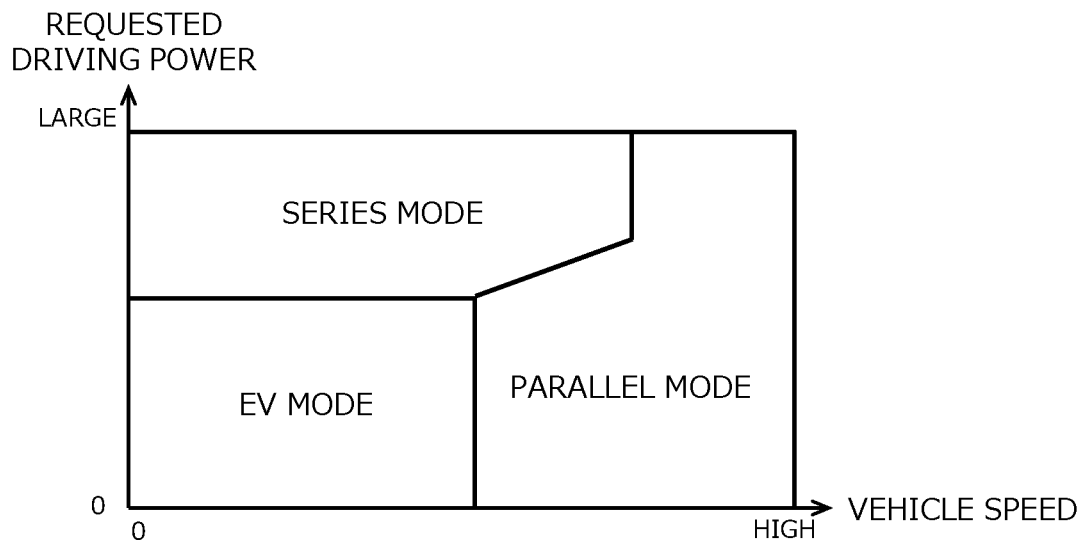
FIG. 2 is an example of a map in which a running mode matching a vehicle speed and a requested driving power is set.

FIG. 2 is an example of a map used for selecting a running mode according to the vehicle speed and the requested driving power. The EV mode is a running mode in which the vehicle 10 is driven only on the motor 3 using the charged power of a battery 9 for driving (see FIG. 1), stopping the engine 2 and the generator 4. The EV mode is selected when the requested driving power and the vehicle speed are both low or when the charging level of the battery 9 is high. The series mode is a running mode in which the generator 4 is driven by the engine 2 to generate electric power and also the vehicle 10 is driven by the motor 3 using the generated electric power. The series mode is selected when the requested driving power is high or the charging level of the battery 9 is low. The parallel mode is a running mode in which the vehicle 10 is driven mainly on the driving power of the engine 2 and assists the driving of the vehicle 10 with the motor 3 as required. The parallel mode is selected when the vehicle speed is high or the requested driving power is high.

As shown in FIG. 1, the drive wheels 5 (here, the front wheels) are connected to the engine 2 and the motor 3 in parallel through a transaxle 20 incorporating therein multiple gears and clutches, and the power of the engine 2 and the power of the motor 3 are transmitted to the drive wheels 5 from the respective different power transmission paths independently of each other. This means that each of the engine 2 and the motor 3 each drives a drive shaft 6 of the vehicle 10. Further, to the engine 2, the generator 4 and the drive wheels 5 are connected in parallel through the transaxle 20, and the power of the engine 2 is also transmitted to the generator 4 in addition to the drive wheels 5.

The transaxle 20 is a power transmission device formed by integrating a final drive (final reduction gear) including a differential gear 18 (differential device) and a transmission (reduction gear), and incorporates therein multiple mechanisms that perform power transmission between driving sources and a driven device.

The engine 2 is an internal combustion engine (gasoline engine, diesel engine) that uses gasoline or diesel oil as fuel. The engine 2 is a so-called lateral engine arranged laterally such that the direction of a crankshaft 2a coincides with the width direction of the vehicle 10, and is fixed to the right side surface of the transaxle 20. The crankshaft 2a is arranged in parallel to the drive shaft 6. The operating state of the engine 2 may be controlled by the controller 1, or may be controlled by another electronic controller (not shown) than the controller 1.

The motor 3 and the generator 4 of the present embodiment are each an electric motor generator having both a function as an electric motor and a function as an electric generator. The motor 3 is a driving source that exchanges power with the battery 9, mainly functions as an electric motor to drive the vehicle 10, and functions as an electric generator during regeneration.

The generator 4 functions as an electric motor (starter) when the engine 2 is stated, and generates, when the engine 2 is operating, electric power as a result of being driven with the engine power. In addition, the generator 4 transmits the driving power to the drive shaft 6 of the vehicle 10 in the power-running state. An inverter (not shown) for converting a direct current and an alternating current is provided around (or in) each of the motor 3 and the generator 4. The rotation speed and the operating state (e.g., power running, and regenerating and power-generating running) of each of the motor 3 and the generator 4 are controlled by controlling the inverter.

The vehicle 10 is provided with the controller 1 for integrally controlling various devices mounted on the vehicle 10. Further, the vehicle 10 is provided with an accelerator opening sensor 31 that detects an amount (accelerator opening degree) of depressing the accelerator pedal and a vehicle speed sensor 32 that detects the vehicle speed. The data detected by each of the sensors 31 and 32 is transmitted to the controller 1.

The controller 1 is an electronic control device configured to be an LSI device or an embedded electronic device in which, for example, a microprocessor, a ROM, a RAM, and the like are integrated, and integrally controls various devices mounted on the vehicle 10. The controller 1 of the present embodiment selects a running mode in accordance with the requested driving power of the driver or the like, controls various devices (e.g., the engine 2 and the rotating electric machines 3 and 4) according to the selected running mode, and also controls the connecting/disconnecting state of the clutches 7 and 8 in the transaxle 20.

The transaxle 20 of the present embodiment is provided with six shafts 11-16 arranged in parallel to each other. Hereinafter, the rotary shaft connected coaxially with the crankshaft 2a is referred to as an input shaft 11, and the rotary shaft connected coaxially with the drive shaft 6 is referred to as an output shaft 12. Similarly, rotary shafts connected coaxially with the rotary shaft of the motor 3 and the rotary shaft of the generator 4 are referred to as an a motor shaft 13 and a generator shaft 14, respectively. Further, the rotary shaft disposed on the power transmission path between the input shaft 11 and the output shaft 12 is referred to as a first counter shaft 15, and the rotary shaft disposed on the power transmission path between the motor shaft 13 and the output shaft 12 referred to as a second counter shaft 16. The both ends of each of the six shafts 11-16 are journaled to a casing of the transaxle 20 through bearings (not illustrated).

Inside the transaxle 1, three power transmission paths shown by patterned bold arrows in FIG. 1 are formed. Specifically, a power transmission path (hereinafter referred to as "first path 41") extending from the engine 2 to the output shaft 12 via the input shaft 11 and the first counter shaft 15, a power transmission path (hereinafter referred to as "second path 42") extending from the motor 3 to the output shaft 12 via the motor shaft 13 and the second counter shaft 16, and a power transmission path (hereinafter referred to as "third path 43") extending from the engine 2 to the generator shaft 14 via the input shaft 11 are formed. The first path 41 and the second path 42 are power transmission paths for driving, and the third path 43 is the power transmission path for power generation.

On the first path 41, the input shaft 11 to which the power is transmitted by rotating in synchronization with the generator 4 and the first counter shaft 15 to which the power of the input shaft 11 is transmitted are provided. Further, in the middle of the first path 41 (on the first counter shaft 15 in the present embodiment), the clutch 7 that engages and disengages the power transmission through the first path 41 is interposed. Hereinafter, this clutch 7 is also referred to as an "engine clutch 7". The first counter shaft 15 is provided with a gear 15a meshing with a gear 11a of the input shaft 11, the engine clutch 7, and a gear 15b meshing with a ring gear 18b of the differential 18 provided on the output shaft 12 from the right side (from the side closer to the engine 2).

The engine clutch 7 is, for example, a wet multi-plate clutch or a dog clutch. The power on the upstream side of the engine clutch 7 on the power transmission path (on the side of the engine 2 and the generator 4) is transmitted to the output shaft 12 when the engine clutch 7 is in the engaged state, and is shut off when the engine clutch 7 is in the disengaged (open) state. The connecting/disconnecting state of the engine clutch 7 is controlled by the controller 1.

The second path 42 is a power transmission path that transmits driving power of the motor 3 to the drive wheels 5. On the second path 42, the motor shaft 13 to which the power is transmitted by rotating in synchronization with the motor 3 and a second counter shaft 16 to which the power of the motor shaft 13 is transmitted are provided. Further, in the middle of the second path 42 (on the second counter shaft 16 in the present embodiment), the clutch 8 (connecting/disconnecting mechanism) that engages and disengages the power transmission through the second path 42 is interposed. Hereinafter, this clutch 8 is referred to as a "motor clutch 8". The second counter shaft 16 is provided with a gear 16a meshing with a gear 13a of the motor shaft 13, the motor clutch 8, and a gear 16b meshing with the ring gear 18b of the differential 18.

The motor clutch 8 is, for example, a wet multi-plate clutch or a dog clutch. The power (i.e., the driving power of the motor 3) on the upstream side of the motor clutch 8 on the power transmission path is transmitted to the output shaft 12 when the motor clutch 8 is in the engaged state, and is shut off when the motor clutch 8 is in the disengaged (open) state. The connecting/disconnecting state of the motor clutch 8 is controlled by the controller 1.

The third path 43 is a path relates to power transmission from the engine 2 to the generator 4 and also to the power transmission from the generator 4 to the engine 2, and is responsible for power transmission when the generator 4 operates as the electric motor and the electric generator, respectively. When the generator 4 operates as an electric motor, the input shaft 11 can be rotated by the driving power of the generator 4. The engine 2 and the generator 4 are directly coupled to each other through gears 11a and 14a that mesh with each other without a clutch. When the generator 4 operates as an electric motor, the driving power of the generator 4 is transmitted to the drive wheels 5 through part of the third path 43 and part of the first path 41.

In the present embodiment, when the running mode is the EV mode or the series mode, the engine clutch 7 is in the disengaged (disconnecting) state and the motor clutch 8 is in the engaged (connecting) state. Further, when the running mode is the parallel mode and the motor assist (driving power of the motor 3) is not required, the engine clutch 7 is in the engaged state and the motor clutch 8 is in the disengaged state. In addition, when the running mode is the parallel mode and the motor assist is required, both the engine clutch 7 and the motor clutch 8 are in the engaged state.

2. Control Configuration

When it is determined that the motor assist is required while running only with the driving power of the engine 2, the controller 1 of the present embodiment engages the motor clutch 8 and also performs control to promptly secure the driving power. Hereinafter, this control is referred to as "assist control". The assist control is performed when the motor clutch 8 is changed from the "disengaged state" to the "engaged state" to deal with an increase in the required driving power of the vehicle 10 while the engine 2 is being driven. This means that the assist control is performed when the running mode is set to the parallel mode without the motor assist.

In the assist control, when the motor clutch 8 is shifted from the disengaged state to the engaged state, the controller 1 makes the generator 4 power run and thereby transmits the power of the generator 4 to the drive wheels 5 so that the driving power until the motor clutch 8 is shifted into the engaged state is compensated by the generator 4. This improves the delay in the response from when the motor assist is determined to be required until the driving power of the motor 3 is actually transmitted to the drive wheels 5.

In addition to the function of performing the above-described assist control, the controller 1 of the present embodiment has a function of calculating the requested driving power, and a function of selecting and setting the running mode based on, for example, the vehicle speed, the requested driving power, and a charging state of the battery 9. In this embodiment, a functional element that calculates the requested driving power is referred to as a "calculation unit 1A", a functional element that sets the running mode is referred to as a "setting unit 1B", and a functional element that carries out the assist control is referred to as a "control unit 1C". These elements indicate some functions of the program executed by the controller 1, and are assumed to be implemented by software. However, some or all of the functions may be achieved by hardware (electronic circuits), or may be achieved by a combination of software and hardware.

The calculation unit 1A calculates the requested driving power (requested output) for the vehicle 10 based on, for example, the accelerator opening degree (APS) detected by the accelerator opening sensor 31 and thee vehicle speed detected by the vehicle speed sensor 32. The calculation unit 1A may calculate a more accurate requested driving power by considering parameters such as a longitudinal acceleration, a lateral acceleration, a steering angle, and an inclination of the vehicle body. The calculation unit 1A constantly calculates the requested driving power when, for example, the main power of the vehicle 10 is turned on or the vehicle speed is not zero as well as when the assist control is being carried out.

The setting unit 1B selects the running mode by applying the current vehicle speed and the current requested driving power to the map, for example, shown in FIG. 2, and sets the selected running mode. The setting unit 1B of the present embodiment changes the respective regions of the map illustrated in FIG. 2 according to the charging state (charge rate) of the battery 9. For example, the regions of the map is changed such that the series mode is more easily selected than the EV mode as the charge rate of the battery 9 becomes lower. In place of changing the regions by the setting unit 1B, multiple maps in which different regions are set for each charging rate of the battery 9 may be stored and selected according to a charging rate.

Next, description will now be made in relation to the configuration of the control unit 1C with reference to FIGS. 3 to 6. Incidentally, the patterned bold arrows in FIGS. 3 to 6 indicate direction of power transmission.

Figure 3:
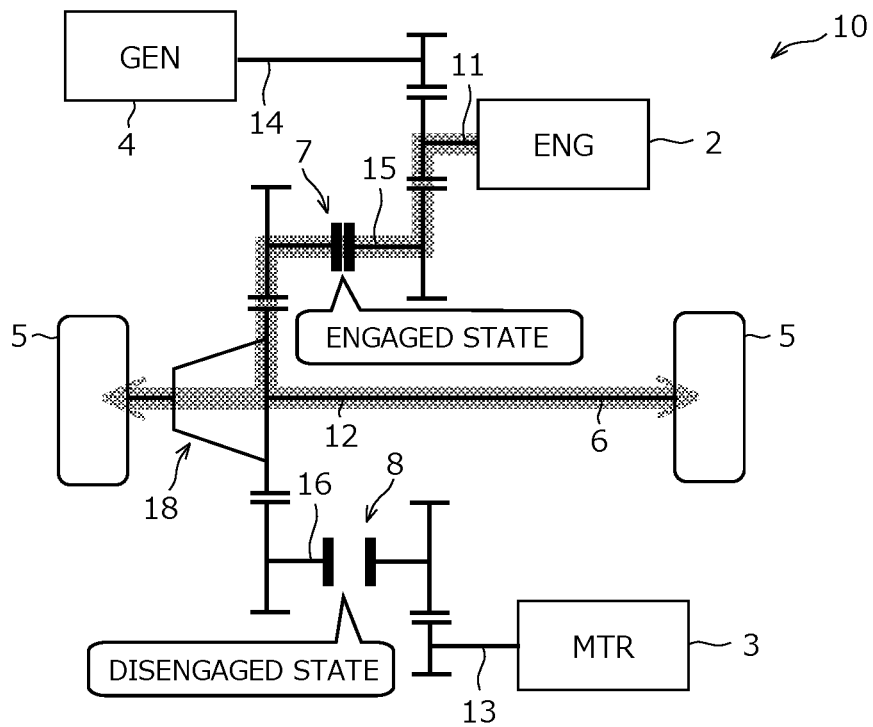
FIG. 3 is a diagram showing power transmission in a parallel mode without motor assist.

As shown in FIG. 3, when the parallel mode is set by the setting unit 1B and the motor clutch 8 is in the disengaged state, the control unit 1C determines whether or not the motor assist is required (whether or not the assist control is to be performed). Specifically, the control unit 1C determines whether the motor assist is required on the basis of the requested driving power calculated by the calculation unit 1A, performs the assist control if the motor assist is required, and does not perform the assist control if the motor assist is not required. Incidentally, since the engine clutch 7 is engaged in the state shown in FIG. 3, the vehicle 10 is running only with the driving power of the engine 2.

The control unit 1C of the present embodiment compares the requested driving power with the maximum driving power of the engine 2, and determines that "motor assist is required" if the former is larger than the latter, and determines that "motor assist is not required" if the former is equal to or less than the latter. Example of a situation where the requested driving power is larger than the maximum driving power of the engine 2 is an occasion when the driver depresses the accelerator pedal for acceleration. Incidentally, the maximum driving power of the engine 2 is set in advance in the controller 1 as a variable value which varies with, for example, the vehicle speed. The control unit 1C obtains the vehicle speed at the time of determining whether or not the motor assist is required, and uses the value (maximum driving power) corresponding to this vehicle speed for the determination.

Figure 4:
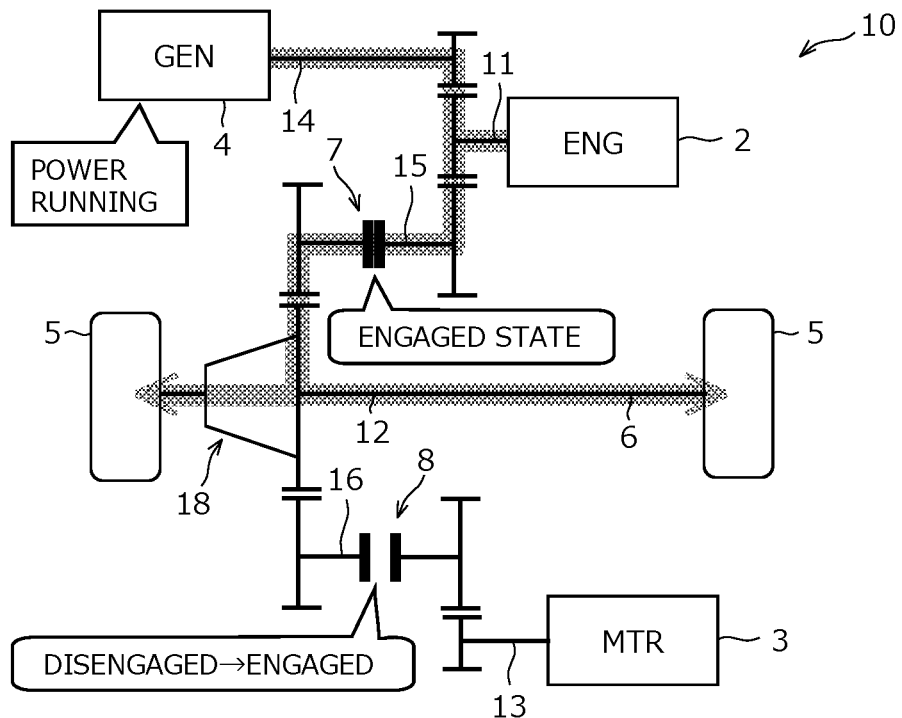
FIG. 4 is a diagram showing power transmission in a state where a requested driving power is increased from the state of FIG. 3.
Figure 5:
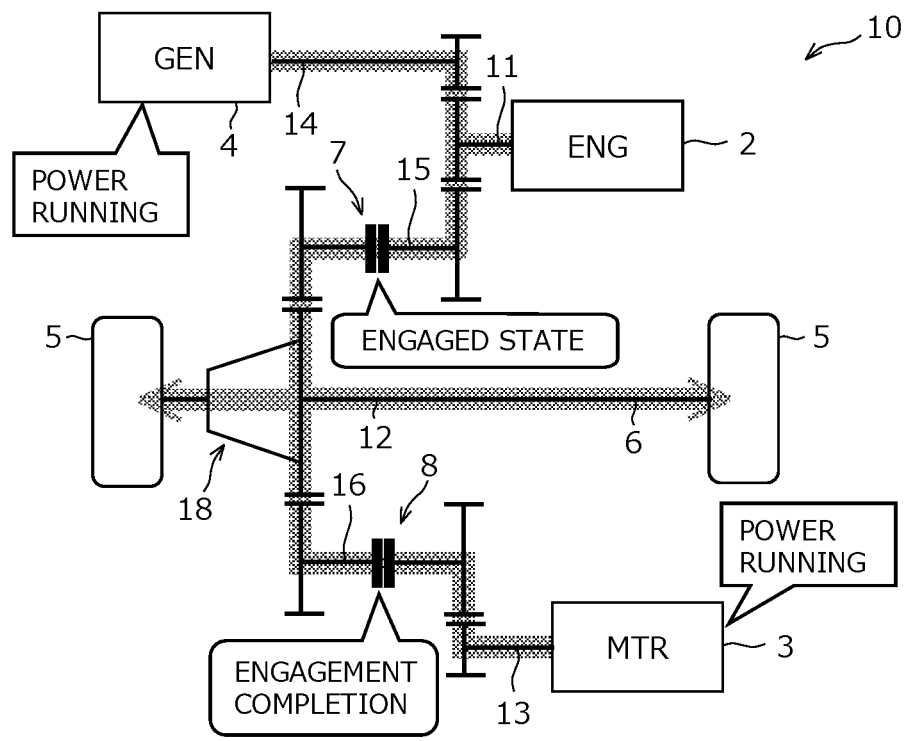
FIG. 5 is a diagram showing power transmission in a state where engagement of a clutch is completed from the state of FIG. 4.

When the assist control is performed, the control unit 1C causes the generator 4 to power run while engaging the motor clutch 8 into the disengaged state, as shown in FIG. 4, to thereby transmit the driving power of the generator 4 to the drive wheels 5. Thus, the driving power until the engagement of the motor clutch 8 is completed is compensated by the generator 4. Then, as shown in FIG. 5, when the engagement of the motor clutch 8 is completed (when the transition to the engagement state is completed), the motor 3 is made power run.

After the completion of a shift into the engaged state of the motor clutch 8, the control unit 1C of the present embodiment controls the generator 4 to be in the power-running state when the requested driving power becomes a predetermined threshold value or more, and controls the generator 4 to be in a no-load state when the requested driving power comes to be less than the threshold value. This threshold value is preset to a value larger than the maximum driving power of the engine 2. Further, the requested driving power to be compared with the threshold value may be a value used in the determination of whether or not the motor assist is required, or may be a value at the time when the engagement of the motor clutch 8 is completed.

Figure 6:
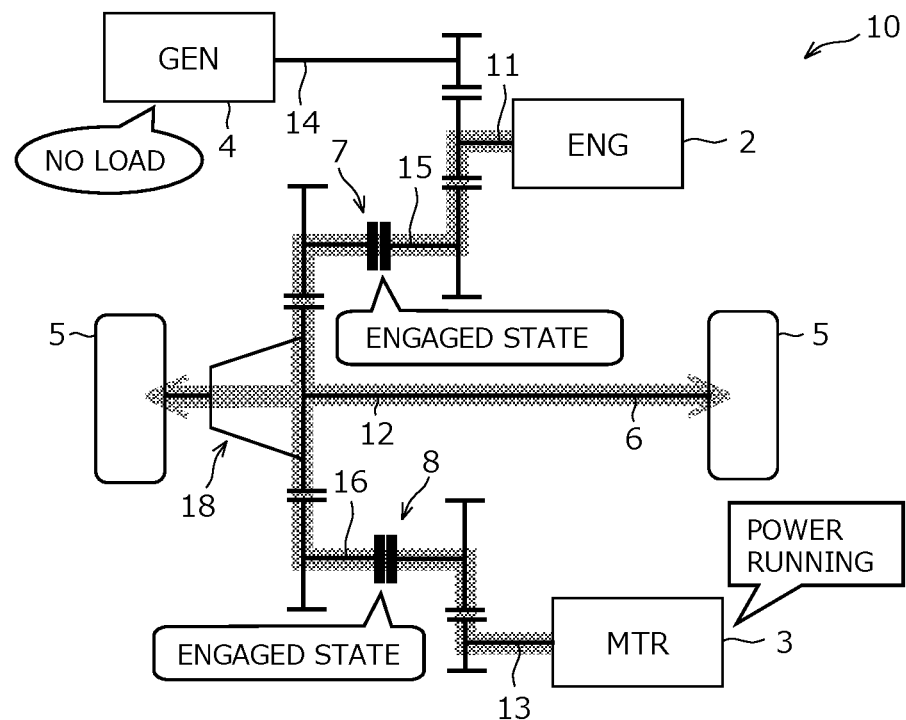
FIG. 6 is a diagram showing power transmission in a state where a generator is made into a no-load state from the state of FIG. 5.

This means that if the requested driving power is even larger than the maximum driving power of the engine 2 (if stronger acceleration is required), the assist by the generator 4 is continuously performed in addition to the motor assist. Conversely, if the requested driving power is larger than the maximum driving power of the engine 2 but less than the threshold value, the control unit 1C determines that the motor assist is sufficient, and as shown in FIG. 6, controls the generator 4 to be in the no-load state upon the completion of shift into a state where the driving power of the motor 3 is transmitted to the drive wheels 5.

If the generator 4 is made power run even after the engagement of the motor clutch 8 (after shifting into the engaged state), the control unit 1C of the present embodiment shifts the generator 4 from the power-running state to the no-load state at the time when the requested driving power falls below the above-described threshold value. Furthermore, when the requested driving power comes to be equal to or less than the maximum driving power of the engine 2 in the state shown in FIG. 6, the control unit 1C disengages the motor clutch 8 again and finishes the motor assist. Thus, the vehicle 10 returns to the state shown in FIG. 3.

3. Flowchart

Figure 7:
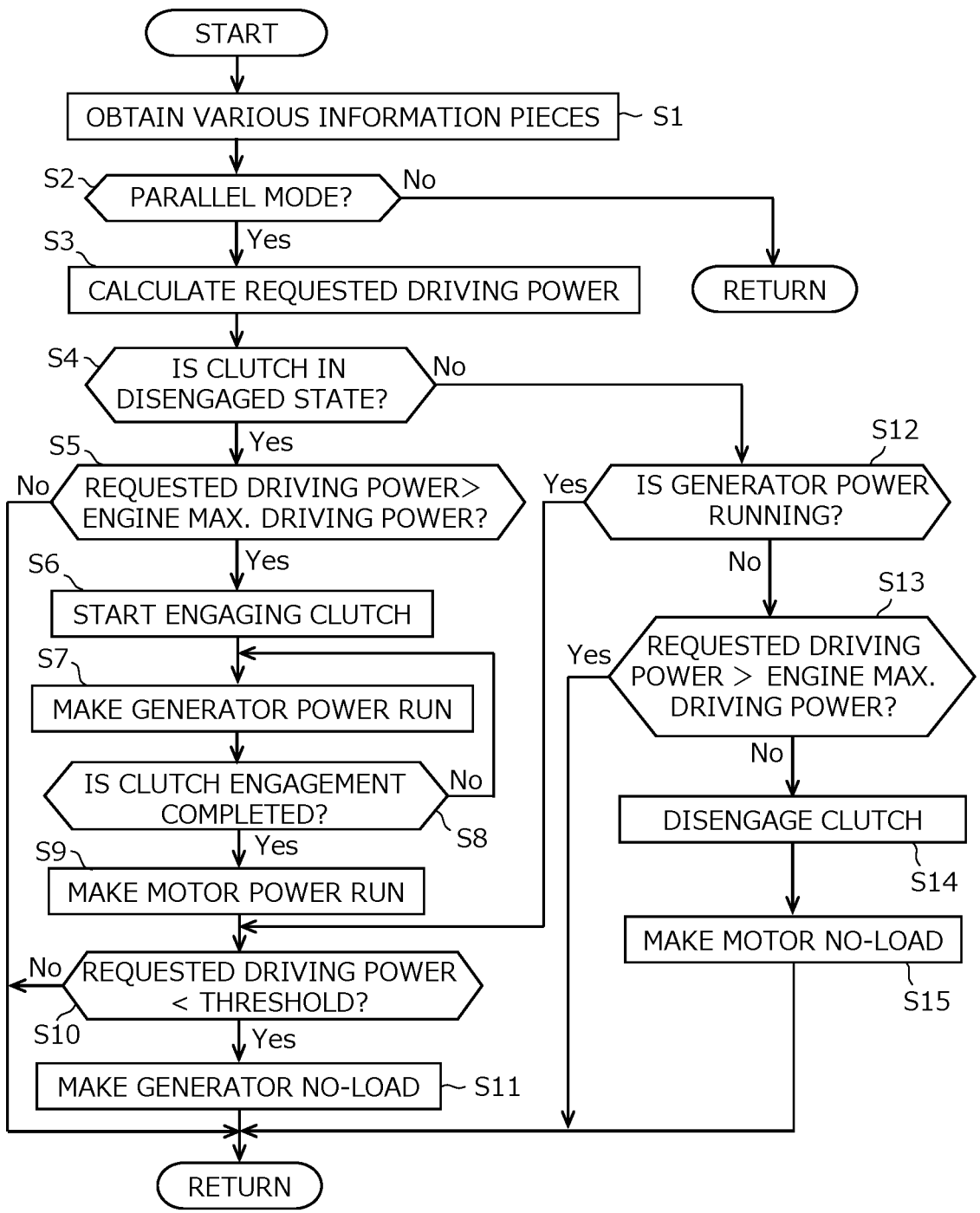
FIG. 7 is a flowchart illustrating an example of details of the control implemented in the controller of FIG. 1.

FIG. 7 is an example of a flowchart illustrating the control details implemented in the above-described controller 1. This flowchart is executed at a predetermined calculation period with the main power of the vehicle 10 is turned on. It is assumed that the setting of the running mode by the setting unit 1B of the controller 1 is executed separately from this flowchart and the information of the running mode to be set is transmitted to the control unit 1C.

In Step S1, the information detected by the sensors 31 and 32 and the setting information of the running mode by the setting unit 1B are transmitted. In Step S2, it is determined whether or not the running mode being currently set is the parallel mode. This flowchart is returned if the current running mode is not the parallel mode. When the current running mode is the parallel mode, the process proceeds to Step S3, where the requested driving power is calculated, and it is determined in Step S4 whether or not the motor clutch 8 is in the disengaged state.

If the motor clutch 8 is in the disengaged state, the process proceeds to Step S5, and it is determined whether or not the requested driving power calculated in Step S3 is larger than the maximum driving power of the engine 2. When this condition is satisfied, the process proceeds to Step S6 to start the engagement of the motor clutch 8, and controls the generator 4 to be in the power-running state (Step S7). Then, it is determined whether or not the engagement of the motor clutch 8 is completed (Step S8), and the compensation for the driving power by the generator 4 is continued until the engagement is completed (Step S7).

When the engagement of the motor clutch 8 is completed and the motor clutch 8 comes to be in the engagement state, the process proceeds to Step S9 to control the motor 3 to be in the power-running state, and determines in Step S10 whether or not the requested driving power is less than the above-described threshold value. If the requested driving power is equal to or larger than the threshold value, the flowchart is returned while keeping the generator 4 in the power-running state because stronger acceleration is required. In this case, in the next calculation period, the requested driving power is calculated (Step S3), and since the motor clutch 8 is in the engaged state, the process proceeds from Step S4 to Step S12.

In Step S12, it is determined whether or not the generator 4 is in the power-running operation. If the result of the determination is positive, the process proceeds from the Yes route to Step S10. That is, when the assist by the generator 4 is also performed in addition to the motor assist under the engaged state of the motor clutch 8, the power-running operation of the generator 4 is continued until the requested driving power calculated in Step S3 falls below the threshold value. In Step S10, when it is determined that the requested driving power is less than the threshold value, the generator 4 is controlled to the no-load state in Step S11, and returns this flowchart.

Further, when the generator 4 is controlled to be in the no-load state while the motor clutch 8 is in the engaged state, the process proceeds from Step S4 to Step S13 through Step S12, and it is determined whether or not the requested driving power calculated in Step S3 is larger than the maximum driving power of the engine 2. If this condition is satisfied, this flowchart is returned and the motor assist is continuously performed. On the other hand, if the condition of Step S13 is not satisfied, the process proceeds to Step S14 where the motor clutch 8 is disengaged and the motor 3 is controlled to be in the no-load state (Step S15), and returns this flowchart.

4. Effects (1) In the above-described controller 1, when the connecting/disconnecting mechanism (i.e., the motor clutch 8 in the present embodiment) is being shifted from the disengaged state to the engaged state in order to deal with an increase in the requested driving power while the engine 2 is being driven, the second rotating electric machine (the generator 4 in the present embodiment) is made power run and transmits its power to the drive wheels 5. With this configuration, a response delay for engagement of the motor clutch 8 since the accelerator pedal has been depressed can be compensated by the driving power of the generator 4. Therefore, it is possible to improve the response delay when the clutch is being engaged.

(2) Since the above-described controller 1 makes the first rotating electric machine (the motor 3 in the present embodiment) power run after the completion of shifting the motor clutch 8 into the engaged state, it is possible to ensure the driving power of the motor 3 after the completion of engagement of the motor clutch 8.

(3) Further, after the completion of shifting the motor clutch 8 into the engaged state, the above-described controller 1 controls the generator 4 to be in the no-load state or the power-running state in accordance with the calculated requested driving power. That is, after the completion of engagement of the motor clutch 8, since the controller 1 determines whether or not to use the driving power of the generator 4 according to the calculated requested driving power, the state of the generator 4 can be appropriately controlled.

(4) Specifically, after the transition to the engaged state of the motor clutch 8 is completed, the controller 1 controls the generator 4 to the power-running state if the calculated requested driving power is equal to or larger than the threshold value, and, conversely, controls the generator 4 into the no-load state if the requested driving power is less than the threshold value. In other words, in cases where acceleration is too large to be managed only with the motor assist, the above controller 1 can achieve a larger driving power by using the power of the generator 4 in addition to those of the engine 2 and the motor 3. In contrast to the above, if the motor assist is sufficient at the time of acceleration, the controller 1 makes the vehicle 10 run with the power of the engine 2 and the power of the motor 3 by making the generator 4 to be in the no-load state so that the vehicle 10 can efficiently run and make the generator 4 to stand-by for being used as the electric generator.

(5) In the above-described controller 1, when the requested driving power comes to be larger than the maximum driving power of the engine 2 while the engine 2 is driven (i.e., during the parallel mode), the motor clutch 8 is shifted from the disengaged state to the engaged state. In other words, since the controller 1 engages the motor clutch 8 only when a driving power exceeding the maximum driving power of the engine 2 is requested, it is possible to achieve both the requested driving power and improvement in electric efficiency.

5. Miscellaneous

The above contents of the assist control are only exemplary, and are not limited to those described above. For example, the timing of shifting the motor 3 into power running is not limited to the timing of the completion of engagement of the motor clutch 8. Further, the above determination using the threshold value may be omitted and alternatively, the generator 4 may be always controlled to be the no-load state after the completion of engagement of the motor clutch 8. Further alternatively, whether the generator 4 is made into the no-load state or the power-running state may be determined according to the elapsed time since the completion of engagement of the motor clutch 8, rather than depending on the magnitude of the requested driving power. In other words, the controller 1 may be configured to control the generator 4 to power run during a predetermined time after the completion of engagement of the motor clutch 8 and then into the no-load state upon expiration of the predetermined time.

The above-described controller 1 starts the assist control when the requested driving power comes to be larger than the maximum driving power of the engine 2 during the parallel mode without the motor assist, but the starting condition of the assist control is not limited to this. For example, a determination threshold is set to a slightly smaller value than the maximum driving power of the engine 2, and the assist control may be implemented when the requested driving power exceeds the determination threshold during the parallel mode without the motor assist. Incidentally, the determination threshold may be a fixed value set in advance or a variable value which is set in accordance with the running state of the vehicle 10, for example.

The structure of the transaxle 20 controlled by the controller 1 described above is only an example, and is not limited to that described above. Further, the relative positions of the engine 2, the motor 3, and the generator 4 to the transaxle 20 are not limited to those described above. Depending on these relative positions, the arrangement of the six shafts 11-16 in the transaxle 20 may be set. The arrangements of the gears provided on the respective shafts in the transaxle 20 is also an example, and is not limited to the one described above.

In addition, the above-described assist control is applicable to a vehicle that mounts thereon two rotating electric machines (e.g., a motor or a motor generator or the like) and an engine, that transmits power of the engine and power of the first rotating electric machine to a drive wheel through respective power transmission paths independently of each other, and that generates electric power by transmitting the power of the engine to a second rotating electric machine. The vehicle is satisfactorily provided with an connecting/disconnecting mechanism on the power transmission path that transmits the power of the first rotating electric machine to the drive wheel. That is, the above-described assist control may be applied to a vehicle having a transmission different from the transaxle 20. In the above embodiment, the motor clutch 8 (the clutch mechanism) is exemplified as the connecting/disconnecting mechanism, but the connecting/disconnecting mechanism is not limited to the clutch. For example, alternative examples of the connecting/disconnecting mechanism are a synchromesh mechanism using an engaging member (sleeve), and a planetary gear mechanism using a sun gear, a carrier, and a ring gear. Likewise, the engine clutch 7 is not limited to a clutch mechanism, but may alternatively be a synchromesh mechanism and a planetary gear mechanism.

The above-described embodiment assumes that the vehicle is a hybrid vehicle of front-wheel drive in which the engine 2 and the motor 3 are mounted on the front side of the vehicle 10, but the above-described assist control is also applicable to the hybrid vehicle of the four wheel drive in which the rear motor (not shown) is mounted on the rear side of a vehicle. Further, the rotating electric machines 3 and 4 mounted on the vehicle 10 are not limited to the motor 3 and the generator 4 described above. The first rotating electric machine may be an electric motor generator or an electric motor having a rotating armature or a field and having at least an electric function. Further, the second rotating electric machine may be a motor generator or a generator having a rotating armature or a field and having at least a generating function.

DESCRIPTION REFERENCE SYMBOL

1 controller
1A calculation unit
1B setting unit
1C control unit
2 engine
3 motor (first rotating electric machine)
4 generator (second rotating electric machine)
5 drive wheel
6 drive shaft
7 engine clutch
8 motor clutch (connecting/disconnecting mechanism)
9 battery
10 vehicle
20 transaxle

The invention claimed is:

1. A controller for a vehicle that mounts thereon an engine, a first rotating electric machine, and a second rotating electric machine, the vehicle transmitting power of the engine and power of the first rotating electric machine to a drive wheel through respective power transmission paths, the vehicle generating electric power by supplying the power of the engine to the second rotating electric machine, wherein:
    the vehicle comprises a mechanism on the power transmission path through which the power of the first rotating electric machine is transmitted to the drive wheel, the mechanism engaging or disengaging the power transmission path; and
    the controller
    calculates a requested driving power of the vehicle,
    when the mechanism is shifted from a disengaged state to an engaged state to deal with an increase in the requested driving power while the engine is running, makes the second rotating electric machine power run and transmits power of the second rotating electric machine to the drive wheel, and
    after shifting of the mechanism into the engaged state is completed, makes the first rotating electric machine power run and makes the second rotating electric machine into a no-load state or a power-running state according to the requested driving power.

2. The controller according to claim 1, wherein:
    the controller controls the second rotating electric machine to be in the power-running state when the requested driving power comes to be equal to or larger than a threshold larger than a maximum driving power of the engine after shifting of the mechanism into the engaged state is completed; and
    the controller controls the second rotating electric machine to be in the no-load state when the requested driving power comes to be less than the threshold after shifting of the mechanism into the engaged state is completed.

3. The controller according to claim 2, wherein the controller shifts the mechanism from the disengaged state to the engaged state when the requested driving power comes to be larger than a maximum driving power of the engine while the engine is running.

4. The controller according to claim 1, wherein the controller shifts the mechanism from the disengaged state to the engaged state when the requested driving power comes to be larger than a maximum driving power of the engine while the engine is running.

* * * * *